United States Patent [19]

Gupta et al.

[11] Patent Number: 4,986,887

[45] Date of Patent: Jan. 22, 1991

[54] PROCESS AND APPARATUS FOR GENERATING HIGH DENSITY HYDROGEN IN A MATRIX

[76] Inventors: Sankar Das Gupta, 29 Sullivan Street, Toronto, Ontario; James K. Jacobs, 60 Albany Avenue, Toronto, Ontario, M5R 3C2, both of Canada

[21] Appl. No.: 331,126

[22] Filed: Mar. 31, 1989

[51] Int. Cl.$^5$ .............................................. C25B 1/02
[52] U.S. Cl. .................................... 204/129; 204/242; 204/292
[58] Field of Search .................... 204/129, 242, 292

[56] References Cited

U.S. PATENT DOCUMENTS

| | | | |
|---|---|---|---|
| 3,433,722 | 3/1969 | Weininger et al. | 204/129 |
| 3,476,607 | 11/1969 | Berger | 429/22 |
| 3,923,542 | 12/1975 | von Benda et al. | 429/207 |

FOREIGN PATENT DOCUMENTS

| | | | |
|---|---|---|---|
| 0048683 | 3/1983 | Japan | 204/242 |

OTHER PUBLICATIONS

Dandapani et al., "Electrolytic Separation Factors on Palladium", Journal of Electroanalytical Chemistry, vol. 39, 1972, pp. 315-332.

Farkas, "On the Electrolytic Separation of the Hydrogen Isotopes on a Palladium Cathode", Trans. Faraday Soc., Apr. 1937; pp. 552-558.

Primary Examiner—John F. Niebling
Assistant Examiner—Kathryn Gorgos
Attorney, Agent, or Firm—Rogers, Bereskin & Parr

[57] ABSTRACT

A process is described wherein hydrogen and its isotopes are dissolved in palladium metal in high density by utilizing electrochemical methods in an electrolytic cell. The cell has an inert anode and a palladium containing cathode, both being immersed in an electrolyte which contains a lithium salt dissolved in an aprotic solvent, and a small amount of water. The dissolved hydrogen to palladium ratio in the palladium bearing cathode, which may be achieved by this process, is in excess of 0.95.

20 Claims, 2 Drawing Sheets

PROCESS AND APPARATUS FOR GENERATING HIGH DENSITY HYDROGEN IN A MATRIX

This invention relates to producing a gas by electrolysis and, subsequently, dissolving it in an electrode matrix.

There has been a need for obtaining hydrogen gas and its isotopes by electrolysis and dissolving the gas in a metal, so that the hydrogen gas can be subsequently utilized for other purposes.

It is known to use palladium for dissolving hydrogen and its isotopes. In a publication by W. Jost entitled "Diffusion in Solids, Liquids and Gases", Academic Press, New York, 1960, it is described that hydrogen and its isotopes may be dissolved in palladium in atomic densities greater than 0.5, by reacting the palladium metal with hydrogen or its isotopes at elevated pressures.

It is also known to dissolve hydrogen obtained by electrochemical techniques in the palladium metal lattice. In experiments described by B. Dandapani and M. Fleischmann, in the Journal of Electronal. Chemistry, 39, 1972, a palladium foil electrode was immersed in a suitable electrolyte (such as 0.5M $H_2SO_4$ or 1M KOH), and the foil was connected in a cell to function as a cathode. The hydrogen generated during the electrolysis was deposited and dissolved in the palladium foil. It was observed that initially the alpha palladium-hydrogen phase was formed followed by the alpha-beta transformation which was found to take place when the hydrogen-palladium ratio had reached 0.6. Subsequent to the hydrogen having reached this density in the metal, hydrogen evolution with gas bubble formation was observed. The typical cathode potential that was measured against a calomel reference electrode during the hydrogen deposition in the foil, was found to be $-0.75$ volts.

It has now been found that hydrogen to palladium ratios substantially in excess of 0.6 can be obtained in a palladium matrix by electrolysis.

A method has now been found for obtaining in an electrochemical cell hydrogen dissolved in high density in a palladium bearing matrix, wherein, a water containing electrolyte comprised of a lithium salt, an aprotic solvent which has a higher solubility for the lithium salt than lithium hydride, an water in concentration less than 0.1M, is electrolyzed between an inert anode and a palladium containing cathode.

An advantageous and novel configuration has been found that the loss of hydrogen through the electrode leads was minimized, when the amount of hydrogen the cathode was capable of dissolving was at least 1000 times greater than the amount of hydrogen the electrode lead was capable of dissolving. The first of said amounts of hydrogen is related to the cathode surface area immersed in the electrolyte. The second of said amounts of hydrogen is related to the electrode lead surface that is exposed to the atmosphere above the electrolyte level contained in the cell.

It is suggested by way of an explanation, without considering that this is the only explanation possible, that the unexpected results of the present invention are related to lithium hydride or lithium hydroxide formation in the proximity of the palladium cathode during the electrolysis process. The hydrogen generated at the cathode surface during the electrolysis first forms lithium hydride with the lithium ions present in the electrolyte. The lithium hydride precipitates, which is due to its low solubility in the electrolyte, and deposits on the cathode surface. The lithium hydride acts as an impedance in the path of further hydrogen generated, thereby forcing the hydrogen atoms to acquire very high energies in order to pass through the lithium hydride to the palladium cathode. This high energy is translated into a beta-transformation of the palladium, which is then capable of retaining much higher densities of hydrogen then has hitherto been observed.

The same considerations apply to obtaining high density hydrogen isotopes in a palladium matrix such as deuterium and tritum, when electrolyzing heavy water contained in an electrolyte of this invention.

Figure 1:
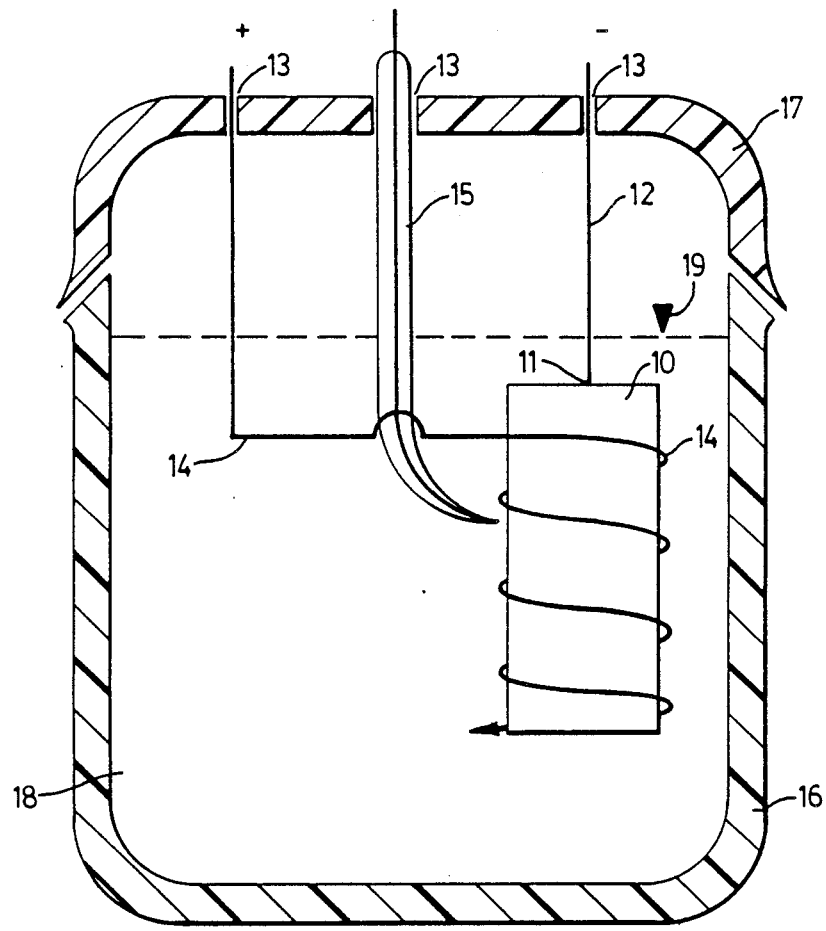
FIG. 1 shows a schematic diagram of an electrolytic cell utilized in practicing the invention.

The preferred embodiment of the invention will now be described by reference to the above figures.

Palladium hydrogen alloys have been used extensively for purification of hydrogen and even for the separation of hydrogen isotopes, since palladium metal is highly permeable to hydrogen and its isotopes, as was discussed hereinabove. At room temperature, palladium can be made to absorb significant quantities of hydrogen by either direct pressurization or by electrochemical processes such as electrolysis. The latter technique is particularly convenient for the production of hydrogen dissolved in palladium.

It is known to insert palladium electrode to be alloyed with hydrogen in water to which some electrolyte has been added to provide electrical conductivity. The palladium is rendered electrically negative with respect to a counter electrode or anode to complete the electrical circuit. The anode may be platinum or other oxidation resistant electrically conducting material. The palladium and the counter electrode are connected to an electrical energy source, and electrical current is passed through the electrolyte whereby the water is electrolyzed to hydrogen and oxygen. The oxygen will generate as bubbles on the anode, that is on the positively charged electrode, and is usually allowed to leave the cell or is collected by some manner which is of no particular interest in the present invention. The palladium electrode is rendered negative, and hydrogen which will be produced at the palladium electrode will enter into the palladium alloying with the metal. The amount of hydrogen which can be introduced into the palladium is limited, and once the voltage applied to the palladium has reached a specific negative value, hydrogen bubbles will appear on the surface of the electrode signifying that no more hydrogen can enter into the matrix of the palladium. A further decrease to more negative values of the applied voltage will be ineffective in increasing the capability of the palladium cathode to dissolve or alloy with more hydrogen.

In the preferred embodiment of the invention, the conditions under which hydrogen can be dissolved in palladium at much higher cathodic voltages then was hitherto possible, is illustrated by working examples. The high density of hydrogen and its isotopes in the palladium matrix may then be utilized as a source of hydrogen in high energy batteries or, alternatively, may be utilized in the process of nuclear fusion.

In another embodiment of of the invention, means of restricting the loss of hydrogen from the palladium electrode during electrolysis is disclosed. It is required that there is an easy electrical path for the electric charge by means of a lead wire connecting the palladium cathode to the electrical energy source. It is, however, necessary to restrict the amount of hydrogen that can be lost through this electrical lead to the surrounding atmosphere. Such restrictions become increasingly important as the hydrogen to palladium ratio increases and an inherent tendency of the palladium to evolve hydrogen to the atmosphere increases as well.

Examples of electrode configurations which have been found especially suitable in practicing the present invention will be described hereinafter.

It was found that certain electrode structures were preferable over others in obtaining high hydrogen-to-palladium ratios in the palladium containing, cathode using the electrolyte of this invention.

It was noted that high hydrogen-to-palladium ratios were obtained using electrode configurations, when the portion of the electrical connecting lead above the electrolyte compared to the total surface of the palladium bearing electrode immersed in the electrolyte, was small. This relationship is expressed as a normalized aspect ratio, which advantageously should exceed the value of 50. This ratio translates to an approximate solubility ratio of the hydrogen dissolved in the palladium to that in the lead wire as being in excess of 1,000.

The schematic drawing of the electrochemical cell utilized in practising the present invention for obtaining high density hydrogen and isotopes dissolved in palladium is shown in FIG. 1.

In FIG. 1, a relatively impact resistant container (16) is shown, having a lid (17) and containing electrolyte (18) to a predetermined level, represented by level mark (19). Reference electrode (15) is also immersed in the electrolyte (18) in the proximity of the palladium bearing electrode (10), to facilitate measurement of the electrical potential of the palladium bearing electrode during the electrolytic process. A counterelectrode or anode (14) is shown encircling the palladium bearing electrode. Electrical lead wires (13) providing contact to the electrodes (10, 14) (13) are introduced through the lid (17). The electrical lead wires provide connections of the cell to the electrical energy source and potential measuring devices (not shown).

Figure 2:
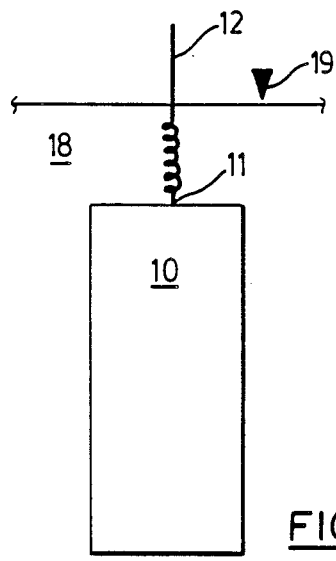
FIGS. 2, 3 and 4 represent schematic drawings of the electrode configuration deployed in the electrochemical hydrogen generation of the instant invention.

The electrical connection of the palladium metal containing electrode by means of a thin palladium wire (12) at contact point (11) is shown schematically in FIG. 2. Like numerals in the figures represent like parts of the apparatus.

Figure 3:
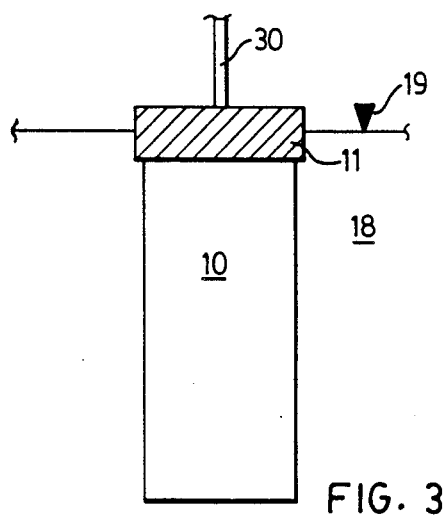

Another embodiment of the palladium containing electrode and its electrical connection is illustrated in FIG. 3, where a metal which is a good electrical conductor such as copper and its alloys, but has a low hydrogen solubility, is shown contacting (11) and enclosing the palladium metal bearing electrode and having a lead wire (30).

Figure 4:
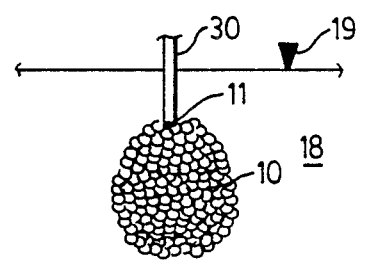

Another embodiment of the palladium bearing electrode configuration is shown in FIG. 4, wherein the palladium electrode (10) is comprised of a number of smaller interconnecting pieces. An electrical conductor (30) which does not dissolve hydrogen in appreciable amounts, is shown to be connected (11) to the palladium electrode design of this embodiment. The position of the electrode with respect to the level, indicated by the level mark (19) of the electrolyte (18) is such that all surfaces of the pieces comprising the palladium electrode (10) are in contact with the electrolyte (18).

EXAMPLE 1

The invention will be described utilizing the electrolytic cell shown in FIG. 1. The palladium electrode (10) was immersed in an electrolyte (18) which is made up of a mixture of hexamethylphosphoramide, lithium perchlorate in a concentration of 0.01M and tetraethylammoniumchloroborate at a concentration of 0.1M. A platinum wire (14) wound around the palladium electrode (10) but not touching it was used as the counterelectrode, and the potential in the proximity of the palladium electrode was measured with a Ag/Ag+ reference electrode (15). The reference electrode was composed of 0.01M silver nitrate and 0.1M tetraethylammoniumchloroborate, which was held in a glass container separated by a porous glass frit and Luggin capillary. An external potential was applied to the palladium and platinum electrodes at the respective leads so that to maintain the electrode potential of the palladium electrode at $-3.0$ volts with respect to the reference electrode. Water was added slowly, so that the electrolysis provided generation of oxygen bubbles at the positively charged counterelectrode (anode) (14) and the electrolysis was maintained for 24 hours at the preset potential. No hydrogen gas generation by bubbles was observed during this period at the palladium containing cathode.

At the end of the experiment, the palladium cathode was disconnected and placed in a vacuum chamber at 350° C., and the amount of hydrogen released from the palladium was determined. The hydrogen-to-palladium ratio in the palladium matrix was always found to be in excess of 0.95.

The electrode configurations shown in FIG. 3 and FIG. 4, respectively, provided equally good results.

EXAMPLE 2

This example describes an electrolytic cell utilizing a platinum electrode as anode and a palladium rod as cathode. A reference electrode of Ag/0.05M AgNO$_3$ containing 0.1M tetrabutylammonium tetra chloroborate electrolyte was also incorporated in the electrical circuit. The reference electrode was used to monitor the actual cathode and anode potentials during electrolysis.

The anode, the cathode and the reference electrode were immersed in an electrolyte. The electrolyte was made up with acetonitrile solvent used in combination with supporting electrolyte of 0.1M tetrabutylammonium tetra fluoroborate, and lithium perchlorate in 0.01M concentration and small amounts of water or deuterium oxide.

In this example, the platinum wire electrode was wrapped around the palladium cathode in such a manner that no direct contact existed between the cathode and anode, while maintaining sufficient exposure of the anode surface to the electrolyte. The reference electrode was separated from the electrolyte and the anode and cathode by a porous glass frit.

The experiments in controlled potential electrolysis were carried out with the aid of a Princeton Applied Research Potentiostat (PAR 173, 174 & 175).

It was noticed that as the potential measured by the reference electrode vs. the cathode decreased from $-0.75$ to $-1.25$ volts, there was no hydrogen gas evolution at the cathodes. The electrolysis was continued for another 8 hours at increasingly negative electropotential without the evolution of any gaseous hydrogen. Hydrogen evolution was only observed at the cathodic potential of being more negative then −2.4 volts.

A similar experiment conducted with heavy water, that is deuterium oxide, produced no deuterium evolution when the cathode potential was lowered beyond −0.75 volts. Similarly, deuterium evolution started only when the cathodic potential of the palladium electrode exceeded −2.4 volts.

It can be seen that the amount of hydrogen and its isotopes, which can be driven into the palladium lattice by the present invention exceeds the potentials obtained in electrolizing water by conventional means in conventional electrolytes.

The atomic ratio of hydrogen and its isotopes to palladium was subsequently measured by releasing the amount of hydrogen in the palladium electrode in a vacuum chamber at 350° C. and determining the amount of hydrogen evolved from the palladium matrix. The hydrogen to palladium or deuterium to palladium ratios observed in these experiments has always exceeded 0.95 and in some cases were even greater than 2.

EXAMPLE 3

In this example, hexamethylphosphoramide solvent was used to provide an electrolyte containing supporting electrolyte in concentrations of 0.1M tetrabutylammonium tetrachloroborate, lithium perchlorate in 0.01M concentration, in addition to the water or deuterium oxide being present in a concentration of less than 0.01M. The anode was a platinum wire, the cathode a platinum rod and the reference electrode and the potentiostat were similar to those described in Example 2.

The water contained in the electrolyte was electrolyzed by increasing the potential difference between the anode and the cathode while measuring the cathode potential by means of the reference electrode. It was observed that the cathode potential has decreased to values less than −1.25 volts without any hydrogen evolution. Experiments were continued for 8 hours without any hydrogen being evolved at the palladium cathode. The potential was further diminished, and when it reached −4 volts, hydrogen evolution had started at the palladium cathode surface.

The atomic ratio of hydrogen to the palladium contained in the cathode matrix, was determined by releasing the hydrogen in a vacuum chamber at 350° C. and measuring the amount of hydrogen evolved.

Several experiments were conducted as described in the above example and it was found that the hydrogen to palladium ratio has always exceeded 0.95, and in some cases, it was greater than 2.

The experiment was repeated with heavy water containing deuterium oxide and similar results were obtained in obtaining deuterium gas.

It was also noticed that lithium deposited from the solvent-electrolyte systems around −3.5 volts measured against the reference electrode, and the lithium deposition onto the palladium cathode created a lithium hydroxide film. It appears that this lithium hydroxide film further lowered the hydrogen evolution and enabled larger quantities of hydrogen to penetrate into the palladium cathode resulting in an even larger hydrogen density in the palladium cathode.

Experiments similar to those described in Example 1, 2 and 3 were conducted utilizing tetrahydrofuran as the solvent in conjunction with lithium perchlorate and small quantities of water or deuterium oxide. Again voltages as negative as −3.6 volts were measured and lithium deposition was found at the cathode surface. The amount of hydrogen dissolved in the cathode was again measured by the technique described in Examples 1, 2 and 3, and similar very high values which were in excess of 0.95 hydrogen to palladium ratio were observed.

Experiments were also conducted using 1,2-dimethoxyethane as solvent together with tetrabutylammonium perchlorate as supporting electrolyte and lithium chloride as the lithium salt together with small quantities of water or deuterium oxide. Similar results as those described above were noticed and hydrogen evolution was not started until the cathode voltage became more negative than −4.0 volts, measured against the silver Ag/Ag+ reference electrode.

In some other experiments, the solvent used was a combination of acetonitrile and sulphur dioxide in dissolving lithium perchlorate and small quantities of water or deuterium oxide. The final densities of hydrogen in palladium achieved in utilizing these solvents were as high as those observed in previous experiments.

The examples described hereinabove illustrate that extremely high hydrogen densities can be obtained in a palladium bearing matrix by the novel process and electrodes of the present invention.

Although the present invention has been described with reference to the preferred embodiments, it is to be understood that modifications and variations may be resorted to without departing from the spirit and scope of the invention, as those skilled in the art will readily understand. Such modifications and variations are considered to be within the perview and scope of the invention and the appended claims.

We claim:

1. A process for retaining hydrogen gas, and its isotopes in a mixed state, in high density in a palladium bearing matrix, said hydrogen and its isotopes having been generated by electrolysis of water, comprising the steps of:
    (a) providing a palladium bearing cathode and an inert anode;
    (b) providing an electrolyte comprising:
        (i) a lithium salt,
        (ii) an aprotic solvent having higher solubility for said lithium salt than for lithium hydride, thereby enhancing the retention of hydrogen and its isotopes in said palladium bearing cathode, and containing said lithium salt in a concentration not exceeding 10 Molar, and
        (iii) water in a concentration less than 0.1M;
    (c) immersing said cathode and said anode in said electrolyte;
    (d) connecting said cathode and said anode so immersed to an external electrical energy source, said energy source being adapted to provide electrical potential difference between said anode and said cathode of magnitude of at least 200 mV in excess of the potential difference required to electrolyze water, thereby generating hydrogen and its isotopes as a mixture at said cathode, and simultaneously retaining said generated hydrogen and its isotopes in said cathode; and
    (e) continuing the generation of hydrogen and its isotopes until said palladium bearing cathode is saturated, and hydrogen and its isotopes are evolving in gaseous form at said cathode.

2. A process according to claim 23, wherein, the electrolyte additionally comprises a supporting electrolyte.

3. A process according to claim 2 wherein, said supporting electrolyte is a tetraalkyl ammonium salt.

4. A process according to claim 3, wherein said tetraalkyl salt is at least one of the group consisting of: tetrabutylammonium tetrachloroborate and tetrabutyl ammonium perchlorate.

5. A process according to claim 1, wherein said hydrogen and its isotopes are recovered from said palladium bearing cathode in a separate step, subsequent to said electrochemical process.

6. A process as claimed in claim 1, wherein the electrical potential difference between said anode and said cathode is adapted to be gradually increased to a magnitude in excess of 3.5 volts.

7. A process according to claim 1 or 6, wherein the aprotic solvent comprised in the electrolyte is at least one member of the group consisting of;
hexamethyl phosphoramide, acetonitrile, tetrahydrofuran, dimethoxyethane, sulphur dioxide, nitromethane, nitro-ethane, dioxolane, diethyl ether, methyl-tetrahydrofuran, 3,5-dimethyl isooxazol, 2,5-dimethyl furan, polyethylene oxide, and polypropylene oxide.

8. A process according to claim 1 or 6, wherein the lithium salt comprised in the electrolyte is at least one member of the groups consisting of: lithium halide, lithium perchlorate, lithium perborate and lithium haloborate.

9. A process according to claim 1 or 6, wherein the water comprised in the electrolyte also contains oxides of hydrogen isotopes.

10. A process according to claim 1 or 6, wherein the water comprised in the electrolyte is heavy water ($D_2O$).

11. A process according to claim 1 or 6, wherein the water comprised in the electrolyte contains at least one of the group consisting of: water soluble acid and water soluble base.

12. A method according to claim 1 or 6, wherein the generated hydrogen and its isotopes retained in the palladium matrix of said cathode has an atomic ratio of at least: Hydrogen and isotopes to palladium 0.95.

13. A palladium bearing cathode configuration to be utilized in the process according to claim 1 for retaining hydrogen mixed with its isotopes in high density, said hydrogen and its isotopes having been generated in an electrolytic process wherein said cathode is immersed in an electrolyte containing water, a lithium salt and an aprotic solvent, comprised of:
an electrode body having a relatively large surface area, made of a predominantly palladium containing matrix which is capable of dissolving hydrogen and its isotopes, and an electrically conducting electrode lead in electrical contact with said electrode body, said electrode lead having a relatively small surface area compared to that of the electrode body, wherein the ratio of a first amount of hydrogen the electrode body is capable of dissolving to a second amount of hydrogen dissolved by the electrode lead, is in excess of 1,000, said first amount being related to the surface area of said electrode body exposed to the electrolyte, and said second amount being related to the surface area of the electrode lead exposed to the cell atmosphere above the electrolyte.

14. A cathode configuration as recited in claim 13, wherein the electrically conducting electrode lead is a palladium containing wire.

15. A cathode configuration as recited in claim 13, wherein the electrically conducting electrode lead has a negligible hydrogen solubility.

16. A cathode configuration as recited in claim 13, wherein the electrode body is comprised of a plurality of irregular shapes of relatively small cross-section being in electrical contact with one another within said body.

17. An electrolytic cell adapted to generating hydrogen and its isotopes in the process according to claim 1 at a potential difference of at least 200 mV in excess of the electrical potential difference required to electrolyze water, and retaining said generated hydrogen and its isotopes in high density in a cathode having a palladium containing matrix comprised in said cell, and said electrolytic cell having a gaseous cell atmosphere above an electrolyte contained therein, comprising:
(a) a container having at least two cell-lead wires entering said container, adapted to provide electrical contact inside the container with an external source of electrical energy;
(b) an electrolyte contained in said container, comprising:
(i) a lithium salt,
(ii) an aprotic solvent having a higher solubility for said lithium salt than for lithium hydride, and containing said lithium salt in a concentration not exceeding 10M, and
(iii) water in a concentration less than 0.1M;
(c) a palladium bearing cathode immersed in said electrolyte, comprising: an electrode body having a predominantly palladium containing matrix and an electrode body surface, and an electrically conducting electrode lead having two ends and a lead surface, one end of said electrode lead being joined to said electrode body, the surface area of said electrode lead being substantially smaller than the surface area of said palladium containing electrode body, wherein the ratio of a first amount of hydrogen and its isotopes the matrix of said electrode body is capable of dissolving, to a second amount of hydrogen and its isotopes dissolved in said electrode lead, is in excess of 1,000, said first amount being related to the surface area of the electrode body immersed in the electrolyte, and said second amount being related to the surface area of the electrode lead exposed to the cell atmosphere above the electrolyte, and the second end of said electrode lead being in electrical contact with one of said cell-lead wires; and
(d) an inert anode immersed in said electrolyte, and connected to said second of said cell-lead wires.

18. An electrolytic cell as recited in claim 17, wherein said electrolyte is further comprising a supporting electrolyte.

19. An electrolytic cell as recited in claim 17, wherein the water comprised in said electrolyte further comprises oxides of hydrogen isotopes.

20. An electrolytic cell as recited in claim 17, further comprising a third electrode which is immersed in said electrolyte, said third electrode being a reference electrode, which has a third electrode lead wire connection, and said reference electrode is being connected by said third electrode lead wire to an electrical potential measuring device.

* * * * *